United States Patent [19]
Bezos et al.

[11] Patent Number: 5,185,700
[45] Date of Patent: * Feb. 9, 1993

[54] SOLID STATE EVENT RECORDER

[75] Inventors: Angel P. Bezos, Montgmery County, Md.; Emilio A. Fernandez; Joseph I. Field, Jr., both of Fairfax County, Va.

[73] Assignee: Pulse Electronics, Inc., Rockville, Md.

[*] Notice: The portion of the term of this patent subsequent to Nov. 12, 2008 has been disclaimed.

[21] Appl. No.: 744,695

[22] Filed: Aug. 13, 1991

Related U.S. Application Data

[63] Continuation of Ser. No. 367,191, Jun. 15, 1989, Pat. No. 5,065,321.

[51] Int. Cl.$^5$ .............................................. G06F 15/74
[52] U.S. Cl. ............................... 364/424.04; 364/550; 360/6; 340/870.41
[58] Field of Search .................. 364/424.01, 424.02, 364/424.03, 424.04, 550, 551.01, 436; 246/167 D, 185; 346/3, 18; 340/539, 825.15, 870.01, 870.04, 870.41; 379/106; 360/5, 6

[56] References Cited

U.S. PATENT DOCUMENTS

| | | | |
|---|---|---|---|
| 3,938,092 | 2/1976 | Callahan | 379/98 |
| 4,071,898 | 1/1978 | Schorsch et al. | 364/424.03 |
| 4,179,744 | 12/1979 | Lowe | 364/424.04 |
| 4,307,455 | 12/1981 | Juhasz et al. | 364/900 |
| 4,582,280 | 4/1986 | Nichols et al. | 246/187 R |
| 4,671,111 | 6/1987 | Lemelson | 364/424.04 |
| 4,692,882 | 9/1987 | Skougaard et al. | 364/424.01 |
| 4,794,548 | 12/1988 | Lynch et al. | 364/424.04 |
| 4,799,162 | 1/1989 | Shinkawa et al. | 364/436 |
| 4,804,937 | 2/1989 | Barbiaux et al. | 364/424.01 |
| 4,817,019 | 3/1989 | Morihara | 364/424.04 |
| 4,853,856 | 8/1989 | Hanway | 364/424.01 |
| 4,853,859 | 9/1989 | Morita et al. | 364/424.03 |
| 4,857,925 | 8/1989 | Brubaker | 340/539 |
| 4,858,133 | 8/1989 | Takeuchi et al. | 364/424.04 |
| 4,897,642 | 1/1990 | DiLullo et al. | 364/424.01 |
| 4,912,471 | 3/1990 | Tyburski et al. | 340/825.55 |

OTHER PUBLICATIONS

Harris Controls; Railroad Products Marketing; Jun. 3, 1982.

Primary Examiner—Parshotam S. Lall
Assistant Examiner—Michael Zanelli
Attorney, Agent, or Firm—Whitham & Marhoefer

[57] ABSTRACT

A solid state event recorder having particular application to railroad locomotives has a plurality of interface modules to allow the collection of desired data over a period of time. Radio downloading of the data provided by a telemetry transmitter to wayside receivers is the primary way of downloading data. Alternate data downloading are provided by a removable memory module, a portable wireless data extractor and a laptop computer. The removable memory module is provided with its own backup battery power supply but normally derives its power from an inductive coupling to the solid state recorder. Data is read into the removable memory module from the solid state recorder via an inductive coupling, and data is read out of the removable memory module to the telemetry transmitter via another inductive coupling. Both the portable wireless data extractor and the laptop computer are used for maintenance purposes. The solid state recorder can be configured in a variety of ways and connected together as master and slave. For example, one recorder, acting as a master and functioning as the primary or operational recorder, can be connected to a second recorder, acting as a slave time synchronized with the first recorder. This second recorder can serve as a maintenance recorder for collecting long term data and trouble shooting a particular locomotive.

3 Claims, 11 Drawing Sheets

FIG. 5A

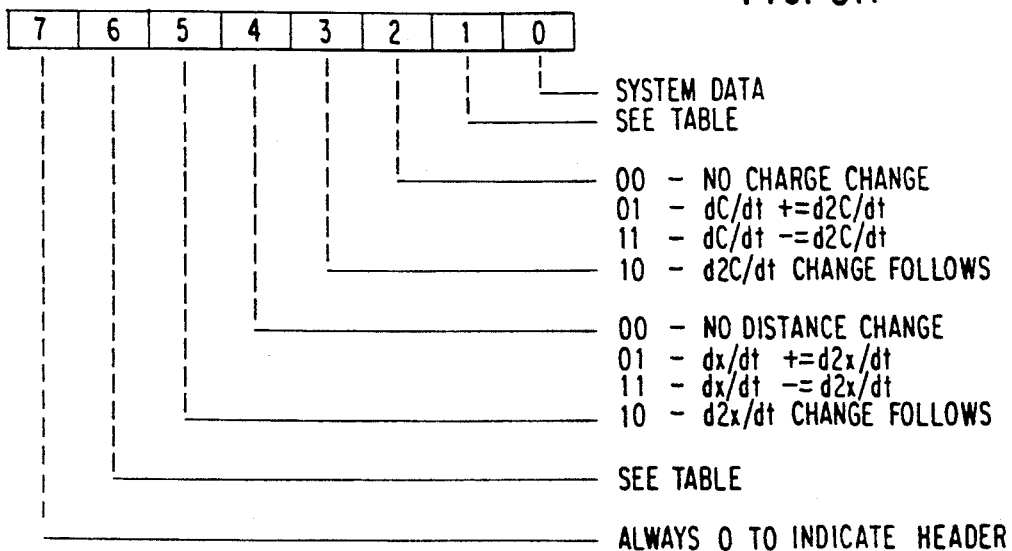

| TABLE | BIT6 | BIT1 | |
|---|---|---|---|
| | 0 | 0 | – DELTA RECORD |
| | 0 | 1 | – INCREMENTAL RECORD WITH NO EVENTS |
| | 1 | 0 | – INCREMENTAL RECORD WITH WITH EVENTS |
| | 1 | 1 | – ABSOLUTE RECORD |

FIG. 5B

1s BIT        INCREASING ORDER >

SYNC BITS 00000000 00000000 00000000 00000000 00000000 01

RELATIVE TIME

TTTTTTTT TTTTTTTT TTTTTTTT TTTTTTTT 01

RECORDER NUMBER

RRRRRRRR RRRRRRRR RRRRRRRR RRRRRRRR 01

LOCOMOTIVE NUMBER

LLLLLLLL LLLLLLLL 01

WHERE,

TTTTTTTT... –     32 BIT BINARY TIME IN SECONDS FROM JAN 1, 1980 00:00:00

RRRRRRRR... –     32 BIT BINARY ENCODED RECORDER NUMBER

LLLLLLLL... –     16 BIT BINARY ENCODED LOCOMOTIVE NUMBER

SOLID STATE EVENT RECORDER

This application is a continuation of application Ser. No. 07/367,191, filed Jun. 15, 1989, entitled "Solid State Event Recorder" now U.S. Pat. No. 5,065,321, issued Nov. 12, 1991.

BACKGROUND OF THE INVENTION

1. Field of the Invention

The present invention generally relates to event recorders for vehicles and, more particularly, to a solid state event recorder which collects desired vehicle data, records the data in solid state memory over a period of time, and provide multiple options for transferring data from the recorder for playback and analysis. The subject invention has particular application in railroad locomotives, but the principles of the invention could be applied to other environments including aircraft and rubber tired road vehicles.

2. Description of the Prior Art

Event recorders for vehicles are well known in the art. These include recorders on trucks commonly required in the European Community states and recorders in airliner cockpits and in railroad locomotives. Such recorders are typically used to enforce regulations, monitor the operation of the vehicle, and to analyze events leading up to an accident in order to determine the cause of the accident.

One such event recorder used in the railroad industry is Pulse Magnetic Tape Recorder (MTR) manufactured by Pulse Electronics, Inc. of Rockville, Md. This recorder was introduced in 1977 and significantly advanced the state-of-the-art in locomotive event recorders. Prior to the introduction of the Pulse MTR, railroads were using mechanical paper chart recorders that were unreliable, difficult to maintain and recorded very limited information. The Pulse MTR significantly reduced the number of moving parts, providing a more reliable recorder that was both affordable and easy to maintain.

Since the introduction of the first MTR, Pulse has continued to increase the capability of the locomotive event recorder system, introducing playback systems to support the on-board recorders. In addition, numerous sensor products have been introduced. Further, the MTR itself advanced from recording only speed, time and distance to the current multi-channel recorder which has become the industry standard.

The Pulse MTR uses a magnetic tape cartridge, similar to the audio tape cartridges. Four tracks of event data are recorded on the endless loop of magnetic tape. In order to obtain the greatest amount of data, the recorder drives the tape at very low speed, but data is overwritten as the tape loop cycles through the recorder. Thus, even at the low tape speed, the data recorded represents a relatively short time period, and because of the low tape speed, the resolution of the data recorded is limited.

To retrieve the data from the MTR, the magnetic tape must be removed from the recorder and taken to a playback station. When thousands of tapes are being extracted from locomotives each month, this represents a significant task. A less labor intensive method of retrieving this data would offer significant productivity advantages to the industry.

For these and other reasons, it is desirable to design a new generation of event recorders for railroad and other applications. These recorders should have a larger capacity for storing higher resolution data over a longer period of time, yet retain the ruggedness and reliability required for such applications. However, due to the large installed base of data playback and analysis equipment, any new event recorder should be compatible with that equipment.

SUMMARY OF THE INVENTION

It is therefore an object of the present invention to provide a new event recorder for use in railroad and other applications which is characterized by a large capacity for recording high resolution data over a long period of time.

It is another object of the invention to provide an event recorder which is not dependent on magnetic tape as the recording medium, yet retains both the ruggedness and reliability of magnetic tape event recorders.

It is yet another object of the invention to provide a rugged and reliable event recorder wherein the mechanical parts of the tape drive system are eliminated.

It is still another object of the invention to provide a less labor intensive method of retrieving data from event recorders, thereby increasing the productivity in analyzing events for operational and maintenance purposes.

It is a further object of the invention to provide a new solid state event recorder which permits playback of locomotive data on existing playback and data analysis equipment.

According to the invention, a new solid state event recorder comprises a plurality of interface modules to allow the collection of desired data over a period of time, typically on the order of sixty hours. The playback results are identical to that of existing Pulse magnetic tape recorders, but the modular design of the new recorder allows for the possibility of adding other functions and features in the future. Moreover, the design provides enhanced functionality to other existing products, including an engine man monitor and a speedometer. Radio downloading of the data provided by a telemetry transmitter to wayside receivers is the primary way of downloading data. Alternate data downloading are provided by a removable memory module, a portable wireless data extractor and a laptop computer. The removable memory module is provided with its own backup battery power supply but normally derives its power from an inductive coupling to the solid state recorder. Data is read into the removable memory module from the solid state recorder via an inductive coupling, and data is read out of the removable memory module to the telemetry transmitter via another inductive coupling. Both the portable wireless data extractor and the laptop computer are used for maintenance purposes. The solid state recorder can be configured in a variety of ways and connected together as master and slave. For example, one recorder, acting as a master and functioning as the primary or operational recorder, can be connected to a second recorder, acting as a slave time synchronized with the first recorder. This second recorder can serve as a maintenance recorder for collecting long term data and trouble shooting a particular locomotive.

BRIEF DESCRIPTION OF THE DRAWINGS

The foregoing and other objects, aspects and advantages will be better understood from the following detailed description of a preferred embodiment of the invention with reference to the drawings, in which:

FIG. 5A illustrates the header definition for all record types;

FIG. 5B illustrates the format for an encoded delta record;

DETAILED DESCRIPTION OF A PREFERRED EMBODIMENT OF THE INVENTION

Figure 1:
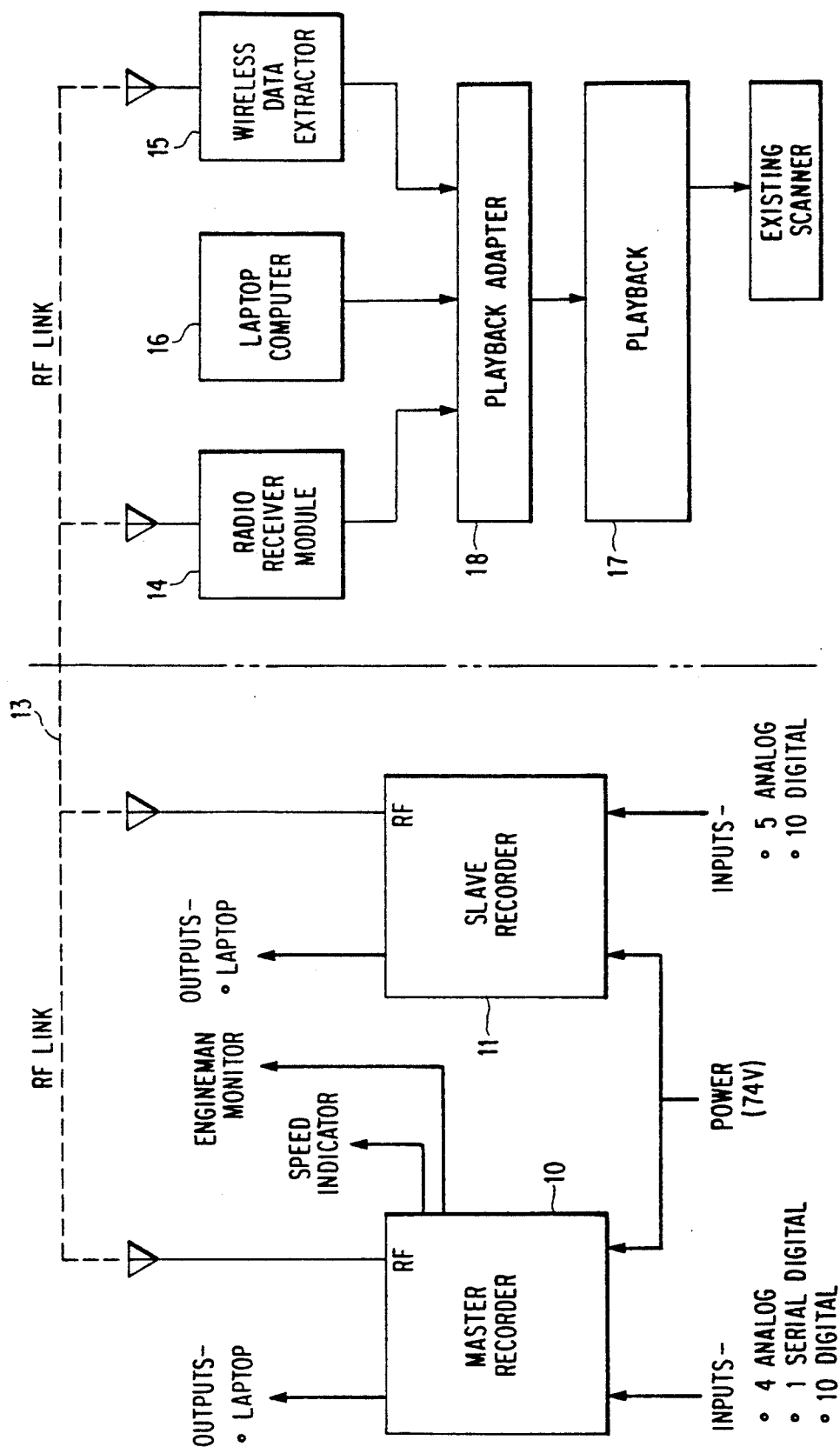
FIG. 1 is a high level block diagram of the overall solid state recorder system according to the invention.

The solid state recorder according to the present invention is described in terms of a locomotive event recorder, but it will be understood that certain features of the recorder could be used in other environments. In the following description, the same reference numerals used in the several figures refer to the same or similar components of the system.

Referring now to the drawings, and more particularly to FIG. 1, there is shown a high level block diagram of the recorder system. This diagram is divided into two parts, the left part of which represents the equipment mounted in a locomotive and the right part of which is installed in a wayside station. On the locomotive are an master recorder 10 and a slave recorder 11, although it will be understood that a slave recorder will not typically be installed. The master and slave recorders 10 and 11 are identical except for their configurations to meet either operational or maintenance requirements. The RF link 13 for radio downloading of data is shown as an output from each recorder 10 and 11. The wayside equipment includes a radio receiver module 14 that receives the data downloaded via the RF link 13. In addition, a portable wireless data extractor 15 may be used to receive the data downloaded via the RF link 13. A "laptop" computer 16 can be used to extract data from the recorders and connects to the playback 17 through the playback adapter (PA) 18.

Figure 2:
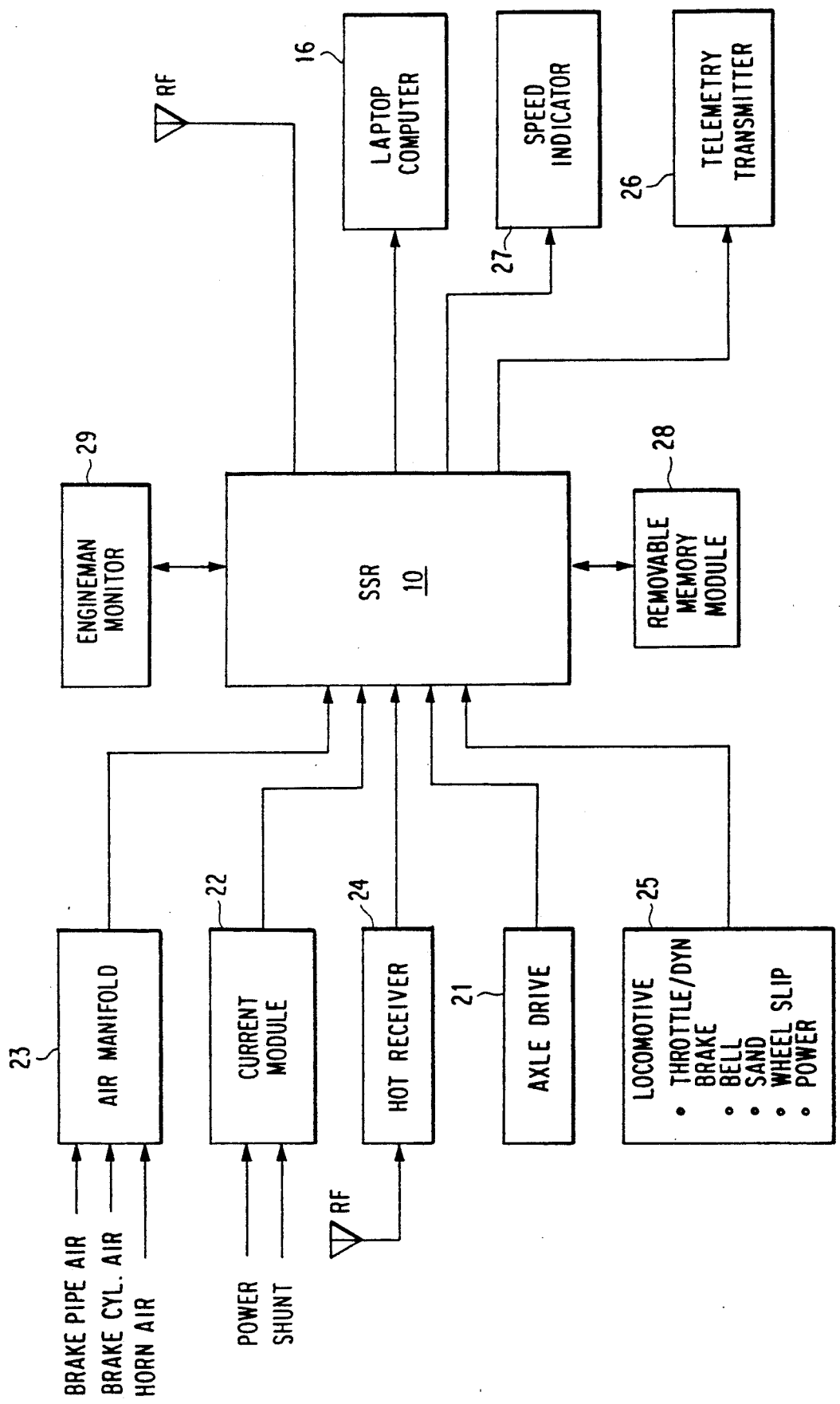
FIG. 2 is a high level block diagram of the solid state event recorder according to the invention showing the input and output interfaces to the recorder.

FIG. 2 shows the basic configuration of the solid state recorder according to the invention. The solid state recorder, generally denoted by the reference numeral 10 includes four analog, one serial digital and several parallel digital inputs. The analog inputs include a speed input from an axle drive 21, traction motor current from a current module 22, and brake pipe air pressure and brake cylinder air pressure from an air manifold 23. The serial digital input is provided by a head of train (HOT) receiving unit 24 which receives telemetered brake pipe air pressure from an end of train (EOT) transmitter (not shown). The parallel digital inputs include direction of travel, throttle and brake switch position data, horn and bell operation, sander circuit status, wheel slip status, plus one or more spares from digital input module 25. Much the same inputs are provided to the magnetic tape recorder currently in use. The outputs include a connection for the laptop computer 16, a telemetry transmitter 26, a speed indicator 27, and an engineman monitor 29. The outputs to the speed indicator 27 and the engineman monitor 29 both simplify these two devices and eliminate redundant wiring since speed and the events monitored by the engineman monitor are also recorded by the event recorder.

The solid state recorder 10 receives the speed signal from the axle drive 21 and provides automatic calibration for wheel size to generate an accurate output to the speed indicator 27 as well as accurately recorded data on speed. The wheel size calibration is accomplished automatically using the serial data input from the HOT receiver 24. A unique EOT code representing a location marker is transmitted to the HOT receiver 24 at the start and end of a measured distance, such as one mile. Using this data, the solid state recorder 10 calculates the wheel diameter and stores it for future computations.

The transaction set between the solid state recorder 10 and the HOT receiver 24 consists of the following:

HERE IS THE EOT PRESSURE — The HOT receiver transmits the pressure.

HERE IS THE SYNCHRONIZING SIGNAL — The HOT receiver transmits the synchronizing signal.

The transaction set is only one way from the HOT receiver 24 to the solid state recorder 10.

A removable memory module 28 is provided with a two-way inductive communication link with the solid state recorder 10, as will be described in more detail hereinafter. The removable memory module 28 receives and stores bytes of data in a continuous loop where newest data over-writes oldest data, analogous to the endless loop magnetic tape but with greatly enhanced capacity. The memory module also continually dumps the data in the continuous loop at a predetermined rate.

The laptop computer 16 provides a checker function and provides the capability to download data from the solid state recorder 10. This data can be stored on an internal hard disk or onto floppy disks. The laptop computer 16 can drive the playback adapter (PA) 18 with selective data from a specific locomotive. The data is selected through a user interface running on the laptop computer.

There are two transaction sets for the laptop computer 16. The first transaction set with the solid state recorder consists of the following:

As a downloader:

DUMP DATA USING XMODEM — Dumps the data, from oldest to newest, using the Xmodem protocol.

As a checker:

WHAT IS THE VALUE OF A SPECIFIED ANALOG CHANNEL — Returns the value of the selected analog channel.

WHAT ARE THE VALUES OF THE EVENTS? — Returns the value of the event bits.

WHAT IS THE SYSTEM STATUS? — Returns the status of the solid state recorder including watchdog resets, memory errors, etc.

The second is a subset of the transaction set with the PA 18. This follows the standard PA transaction set and consists of:

START/CONTINUE SENDING DATA — Toggles the flow of data from the laptop computer.

STOP SENDING — suspends data transfer.

SET DUMP POINTER TO OLDEST DATA — Allows the data dump to go from oldest to newest data.

DUMP DATA FROM NEWEST TO OLDEST — Dump the newest data first. Allows determining the last locomotive, etc.

Figure 3:
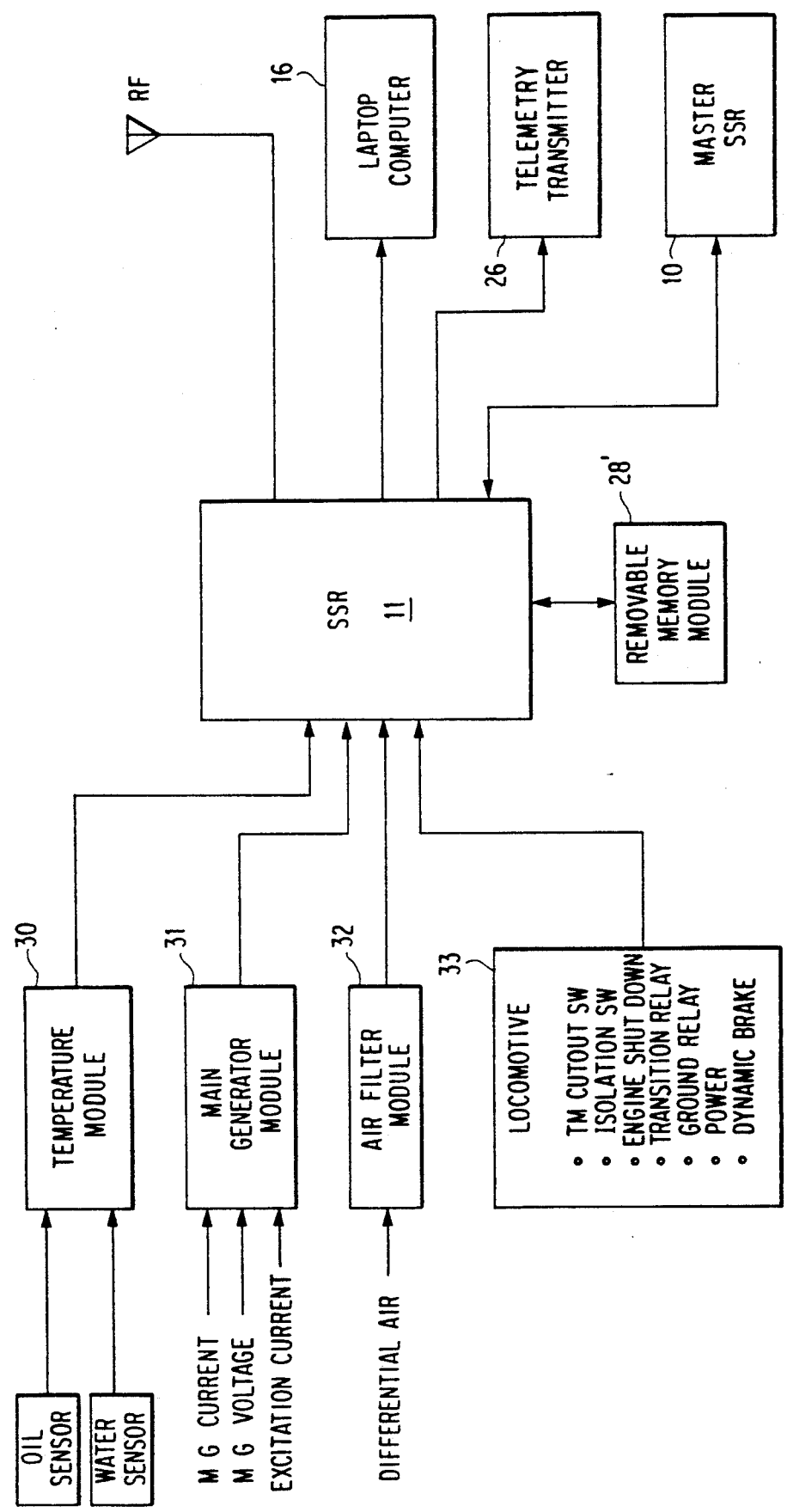
FIG. 3 is a high level block diagram of the solid state event recorder, connected as a slave to a master recorder, according to the invention showing the input and output interfaces to the recorder.

The maintenance configuration of the solid state recorder 11 is shown in FIG. 3. As mentioned, this solid state recorder is otherwise identical to solid state recorder 10 and includes its own removable memory module, here denoted 28'. In the maintenance configuration, the solid state recorder 11 operates as a slave to the installed solid state recorder 10 for recording additional locomotive inputs.

There are five analog inputs including oil temperature and water temperature from a temperature module 30 and main generator/alternator current and voltage and excitation current from a main generator module 31. There are ten digital inputs including an engine air filter status from an air filter module 32 and a plurality of locomotive inputs from module 33. These include dynamic brake voltage, traction motor cut out switch position, isolation switch position, ground relay status, engine status, and transition relay status. The temperature module 30, main generator module 31 and air filter module 32 are maintenance modules. The outputs of the solid state recorder 11 in its maintenance configuration are same as for its operational configuration. The primary reason for the link from the master operational solid state recorder 10 and the slave maintenance solid state recorder 11 is for time synchronization. The following transaction set is used:

WHAT TIME IS IT? — The slave solid state recorder requests the current time from the master solid state recorder.

The telemetry transmitter 26 is used to download data to a wayside receiver. This is the primary method for retrieving data from the solid state recorder. Data can be downloaded using the telemetry transmitter while the locomotive is in a railroad service facility, as when it is being refueled, or while the locomotive is under way, by transmitting to wayside stations along the track road bed. Each transmitter is assigned a unique code number, and this code number is recognized by the receiver. As will be described in more detail hereinafter, signals and power to the transmitter must be isolated from the solid state recorder. There is no transaction set from the solid state recorder to the transmitter. Data is continuously downloaded from the removable memory module 28 to the telemetry transmitter 26 except when interrupted by the solid state recorder to write data to the memory module.

The wireless data extractor 15 is a portable radio receiver that will receive data by radio from the solid state recorder. This device is capable of downloading a plurality of locomotive recorders and is used primarily at maintenance and inspection facilities. However, a road foreman can also use the wireless data extractor 15 while the locomotive is under way to retrieve data as the locomotive passes, for example, a grade crossing.

The following is a list of locomotive interfaces for the solid state recorder. These interfaces come from either a direct connection to a locomotive signal or from an interface module.

TYPE I — sampled digital event input direct connection to locomotive signals 74 V nominal input TYPE II — latching digital event input direct connection to locomotive signals minimum pulse width 250 ms adjustable 74 V nominal input TYPE III — sampled digital event input connection to interface module 24 V nominal input TYPE IV — axle drive input connection only to axle drive frequency modulated TYPE V — FM input connection to interface module 13 V nominal input TYPE VI — analog voltage direct connection to locomotive signals 74 V nominal full scale 4-bit resolution TYPE VII — FM input connection to interface module 24 V nominal input It will, of course, be understood that these inputs are merely exemplary and can vary depending on the specific application.

Figure 4:
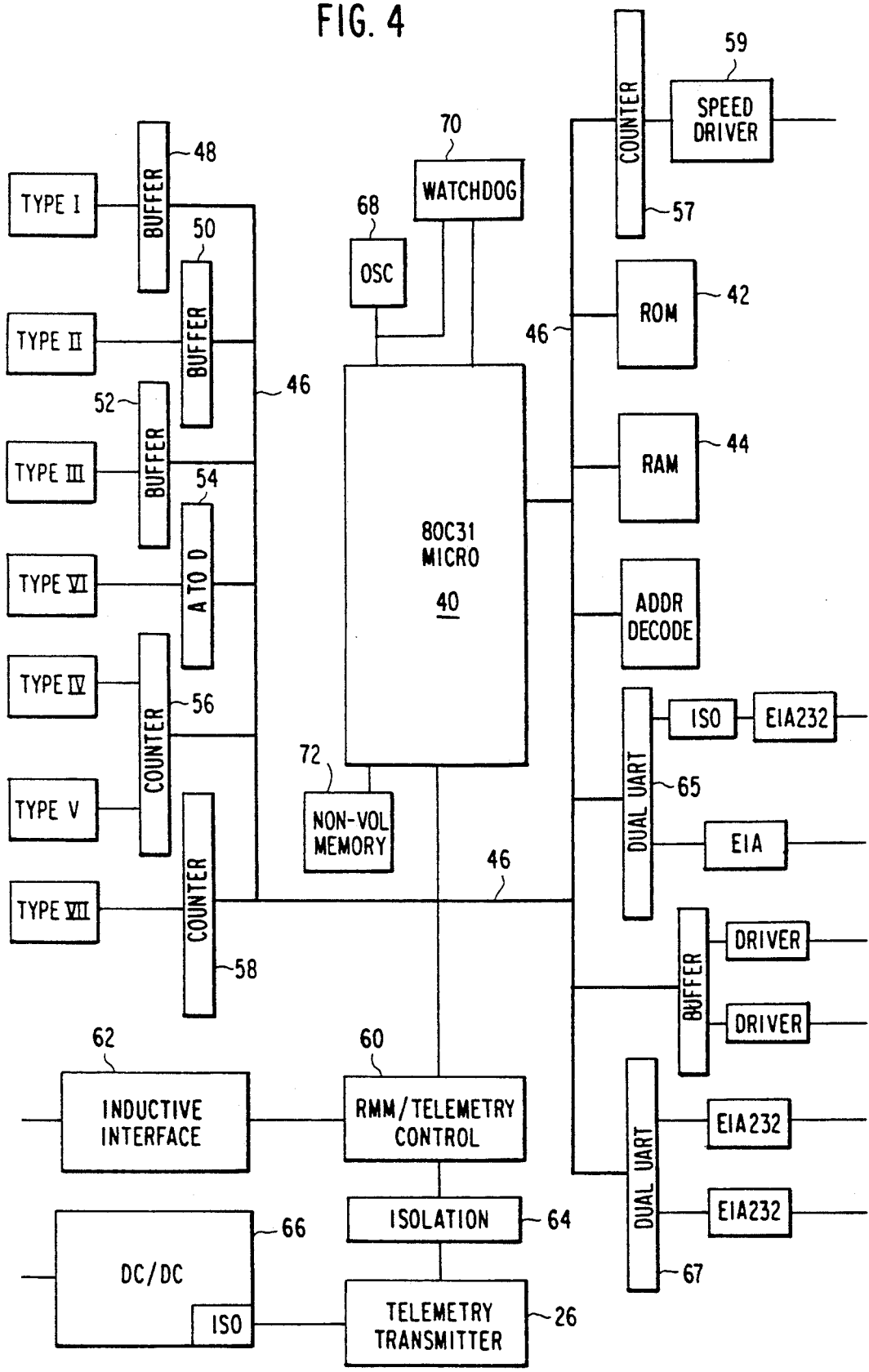
FIG. 4 is a detailed block diagram of the solid state event recorder.

FIG. 4 is a detailed block diagram of the solid state recorder according to the invention. The heart of the recorder is an 80C31 CMOS (complementary metal oxide semiconductor) microprocessor 40 supported by read only memory (ROM) 42 storing the control program and random access memory (RAM) 44 for temporary storage for the control program. It is driven by an 11.0592 MHz clock to allow standard baud rates to be used on the internal serial port. An internal UART (universal asynchronous receiver/transmitter) is used in a full duplex mode and provides a data link to the removable memory module 28.

The ROM 42 and the RAM 44 communicate with the microprocessor 40 via a common bus 46 to which other inputs and outputs are connected. Specifically, the Types I, II and III inputs are connected via respective buffers 48, 50 and 52 to the bus 46. The Type VI input is connected via an analog-to-digital (A/D) converter 54 to the bus 46. The Types IV and V inputs are connected via a counter 56 to the bus 46, and the Type VII input is connected via a counter 58 to the bus 46.

Another counter 57 is used to drive the speed output channel. The speed driver 59 is a transformer coupled output that can drive up to five speedometers with a resolution down to 0.1 mph.

The microprocessor 40 is also connected to a removable memory module/telemetry control 60 through which it accesses the remote memory module for writing data via an inductive interface 62. The telemetry control 60 provides data flow control to the removable memory module from the microprocessor 40 and from the removable memory module to the telemetry transmitter 26. Basically, it is a switch under the control of the microprocessor which routes the data. When not being accessed by the microprocessor 40, the remote memory module dumps data to the telemetry transmitter 26 via the inductive interface 62, the control 60 and an isolation circuit 64. Power is supplied to the telemetry transmitter 26 via a DC/DC invertor 66 connected to the locomotive 74 V power.

A first dual UART 65 provides two serial channels; one providing a three wire EIA232 interface, and the other providing a three wire isolated EIA232 interface. A second dual UART 67 provides EIA232 drivers and an asynchronous protocol.

A crystal oscillator 68 is used for the microprocessor clock and the watchdog 70. The watchdog 70 is a pair of cascaded counters, an output of which is used to disable the logic power supply. An RC time delay is added to the signal so that at power down, when the counter is reset, power restoration is delayed. The purpose of this power cycling is to help prevent latch-up of the CMOS (complementary metal oxide semiconductor) circuitry.

In addition to the ROM 42 and RAM 44, the microprocessor communicates with a non-volatile memory 72. This may be implemented with an EEPROM (electronically erasable and programmable read only memory). This memory is used to save nonvolatile data such as locomotive number.

Figure 5:
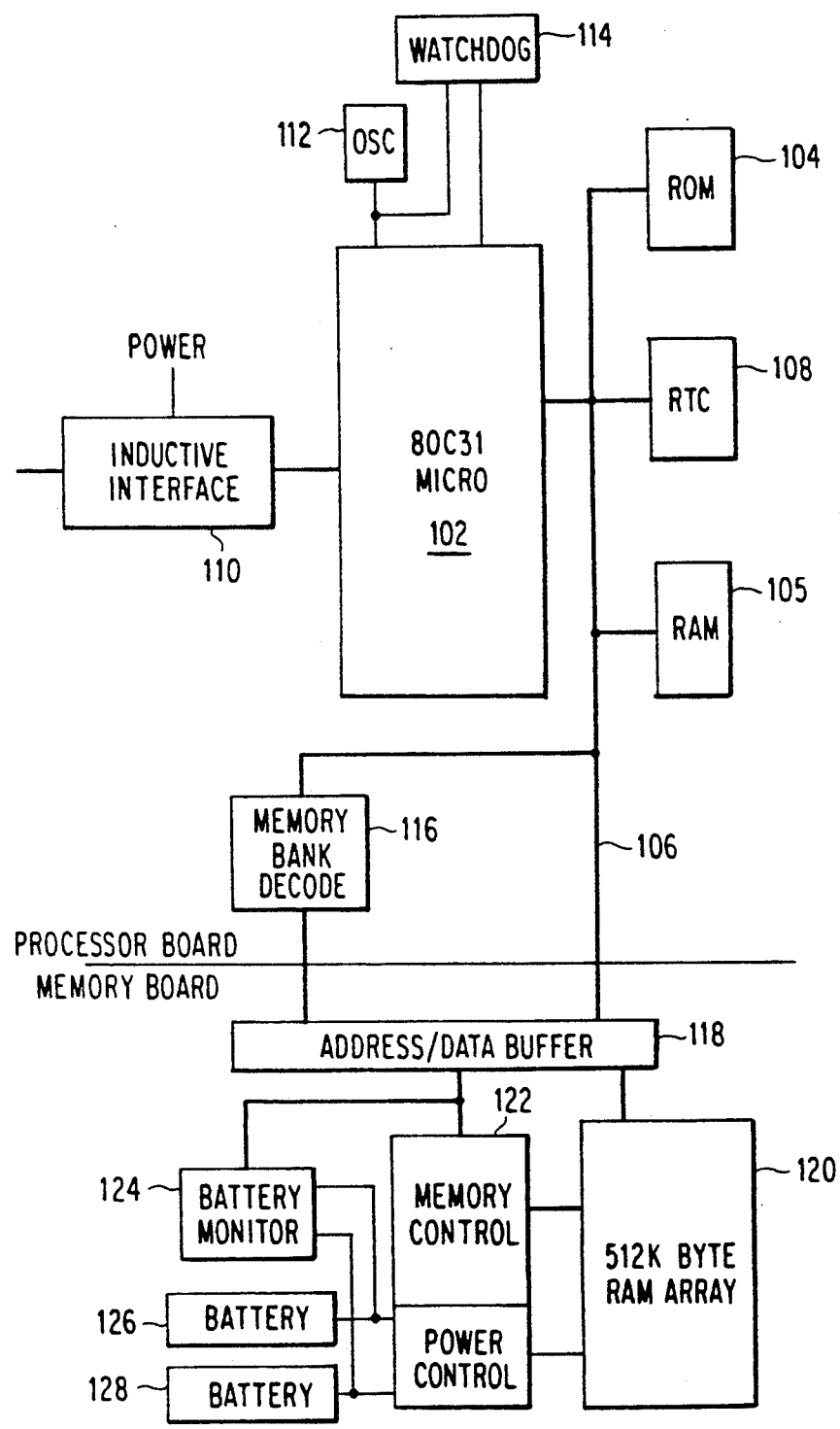
FIG. 5 is a detailed block diagram of the removable memory module used with the solid state event recorder.

FIG. 5 is a detailed block diagram of the removable memory module 28. Like the solid state recorder 10 or 11, the heart of the memory module is an 80C31 microprocessor 102 supported by a ROM 104 storing the microprocessor control program and a RAM 105 for temporary storage. The microprocessor 102 is also driven by an 11.0592 MHz clock and includes an internal UART used in full duplex mode to communicate with microprocessor 40 through the inductive coupling. The ROM 104 communicates with the microprocessor 102 via a bus 106, as does a real time clock (RTC) 108. The RTC 108 is used to provide the timekeeping function for the system, and may be implemented with a DS1216 integrated circuit. As will be described in more detail hereinafter, the RTC must be fairly accurate, but absolute precision is not required because the time of the RTC is treated as relative time in the analysis of the data.

The microprocessor 102 communicates with and receives power via the inductive interface 110. This interface is proximate to and aligned with the inductive interface 62, as will be described in more detail hereinafter. Like the microprocessor 40, the microprocessor 102 is provided with a crystal oscillator 112 and a watchdog 114.

Connected to the bus 106 is a memory bank decoding circuit 116 which provides the interface between the microprocessor 102 and the solid state memory on the memory board. The memory board itself interfaces with both the memory bank decode circuit 116 and the bus 106 via an address/data buffer 118 which provides buffering between the microprocessor and the memory array 120. The memory array 120 is a 512 kByte RAM array consisting of 16 32 k×8 static RAM devices. The choice of RAM chips is dictated by low power data retention and power consumption. The address/data buffer 118 also communicates with a memory control/power control module 122 and a battery monitor 124. Power control switches from system to battery power in the event of power loss. One of two batteries 126 or 128 is selected based upon the one with the higher voltage. Lithium primary-cells are used to insure RAM data retention. The batteries are isolated from each other by a pair of Schotkey diodes (not shown).

The basic transaction set used with the removable memory module consists of the following:

START/CONTINUE DUMPING TELEMETRY DATA — Dump telemetry data using the telemetry data pointer.
STOP DUMPING TELEMETRY DATA — Stop dumping telemetry data.
START/CONTINUE DUMPING DATA — Dump data oldest to newest using alternate dump pointer.
STOP DUMPING DATA — Stop dumping data.
RECEIVE BYTES — Accept bytes of data and store in a temporary buffer.
STORE LAST BYTES — Store the bytes in the temporary buffer in memory at the next continuous loop location.
TRANSMIT STATUS — Transmit the status information about the battery, errors, etc.
SET DUMP POINTER TO END — Set the alternate dump pointer to the end of the continuous loop.
DUMP DATA FROM NEWEST TO OLDEST — Dump the newest data first. Allows determining the last locomotive, etc.
WHAT IS THE CURRENT TIME? — Returns the current time in clock format.
TIME ERROR UPDATE — Accept in clock format and store the time error.
WHAT IS THE TIME ERROR — Returns the time error in clock format.

The datalink protocol consists of message echo, ACK/NACK and byte parity. Three types of datalink transactions are available:

Command — The command transaction occurs when a command requiring no data transfer is requested. In this transaction, the removable memory module receives a command and responds with the command followed by an ACK if the command is valid and has been executed. It responds with the command followed by a NAK if it could not be executed. The status of the removable memory module contains information about the reason for the last NACKed command.

Data Reception — The data reception transaction occurs when a command requiring data transfer to the removable memory module is requested. In this transaction, the removable memory module receives a command followed by a byte count, one or more data bytes depending upon the command, and a checksum. It responds with the command followed by the data followed by an ACK or NACK.

Data Transmission — The data transmission transaction occurs when a command requiring data transfer from the removable memory module is requested. In this transaction, the removable memory module receives a command and responds with the command followed an ACK or NACK. If a NACK, no other data is sent. If an ACK, then data is sent as a byte count followed by one or more bytes of data and then the checksum.

Checksum Calculation — The checksum is a one byte sum of the count byte and all the data bytes.

The data encoding scheme used in the solid state recorder may be described as a type of delta encoding scheme. Tow types of signals are recorded by the solid state recorder, pulse width modulated signals representing speed and current and bit inputs representing the state of event inputs. The solid state recorder records information about the pulse modulated signals to allow reproduction at the playback but utilizes no knowledge of the units of the signals. The event signals undergo encoding within the solid state recorder.

There are three types of data records; an absolute record, an incremental d2/dt update record, and a delta record. The absolute record consists of a header and absolute values for the speed, acceleration, current, time rate of change of current and the events. This record is stored every minute or every sixty delta records. The absolute record provides a reference point for both playback as well as for error detection.

The incremental d2/dt update record updates the current d2/dt for both speed and current and is also used for event changes. This record is only written if the d2/dt for either speed or current changes of if the events change.

The delta record contains changes which occur within the present d2/dt. The system data is also encoded within this record. Delta records are written every second. Delta records are the only records which have time associated with them. The other two records are written in virtual zero time.

There is a universal header definition for all record types, as shown in FIG. 5A. The delta record format is just the header. As to the incremental d2/dt updata record format, if any d2/dt changes occur, the data is encoded as follows:

| Header | |
|---|---|
| [charge d2/dt] | 10 bits |
| [distance d2/dt] | 10 bits |
| [events] | 10 bits |

Data is encoded into sequential bytes. The most significant bit (MSB) of all data bits is set to one to permit distinguishing the data bytes from the header. The square brackets indicate that one or more of the data groups are optional. If more than one group is present, they will be in the indicated order.

Every minute an absolute record is written. The absolute record format is as follows:

| Header | |
|---|---|
| charge d/dt | 10 bits |
| charge d2/dt | 10 bits |
| distance d/dt | 10 bits |
| distance d2/dt | 10 bits |
| events | 10 bits |

The first bit of each delta record contains the system data. A synchronizing bit stream precedes the system data. The data format is shown in FIG. 5B.

Figure 6:
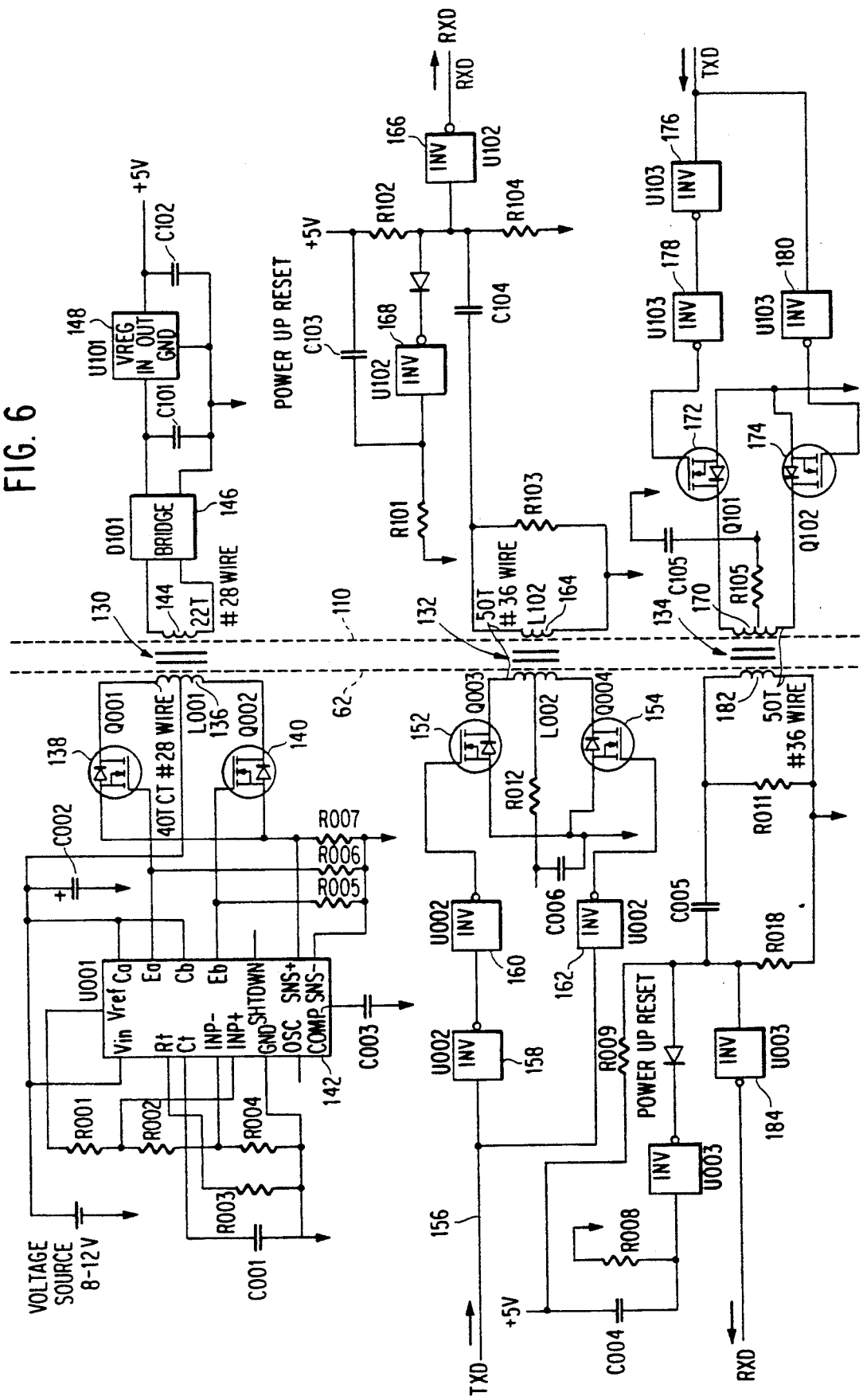
FIG. 6 is a schematic circuit diagram of the inductive interface between the solid state recorder and the removable memory module.

FIG. 6 is a detailed schematic diagram showing the inductive interfaces 62 and 110. These comprise three ferrite core pairs 130, 132 and 134. The first of these core pairs 130 couples system power to the removable memory module. The ferrite core in the recorder is wound with a primary winding 136 and driven by a pair of MOSFETs (metal oxide semiconductor field effect transistors) 138 and 140 under the control of a driver circuit 142. This generates a square wave signal in the primary winding 136 which is coupled to the secondary winding 144 wound on the ferrite core in the removable memory module. This secondary winding is connected to a rectifier bridge circuit 146 which provides a DC voltage output to a voltage regulator circuit 148. The filtered and regulated +5 V output from the regulator circuit 148 is used to provide power to the circuits of the removable memory module.

Data from the microprocessor 40 is written to the removable memory module 28 via the inductive coupling comprised of the ferrite core 132 pair. A primary winding 150 wound on the core in the recorder 10 is driven by a pair of MOSFETs 152 and 154 driven by a signal on data line 156. The invertors 158, 160 and 162 serve the dual function of driver and phase splitter for the MOSFETs 152 and 154. The secondary winding 164 wound on the ferrite core in the removable memory module is connected via an invertor 166 to the microprocessor 102. A power up reset circuit comprising invertor 168 is used to insure that the a reset signal is sent to the microprocessor 102 at power up.

Data from the removable memory module 28 is supplied to the telemetry transmitter 26 via the ferrite core pair 134. A primary winding 170 wound on the ferrite core in the removable memory module is driven by a pair of MOSFETs 172 and 174, which are in turn driven by invertors 176, 178 and 180. A secondary winding 182 wound on the ferrite core in the recorder is connected to an invertor 184. It will be appreciated that this inductive interface is identical, except in direction of communication, with the one just described.

Figure 7:
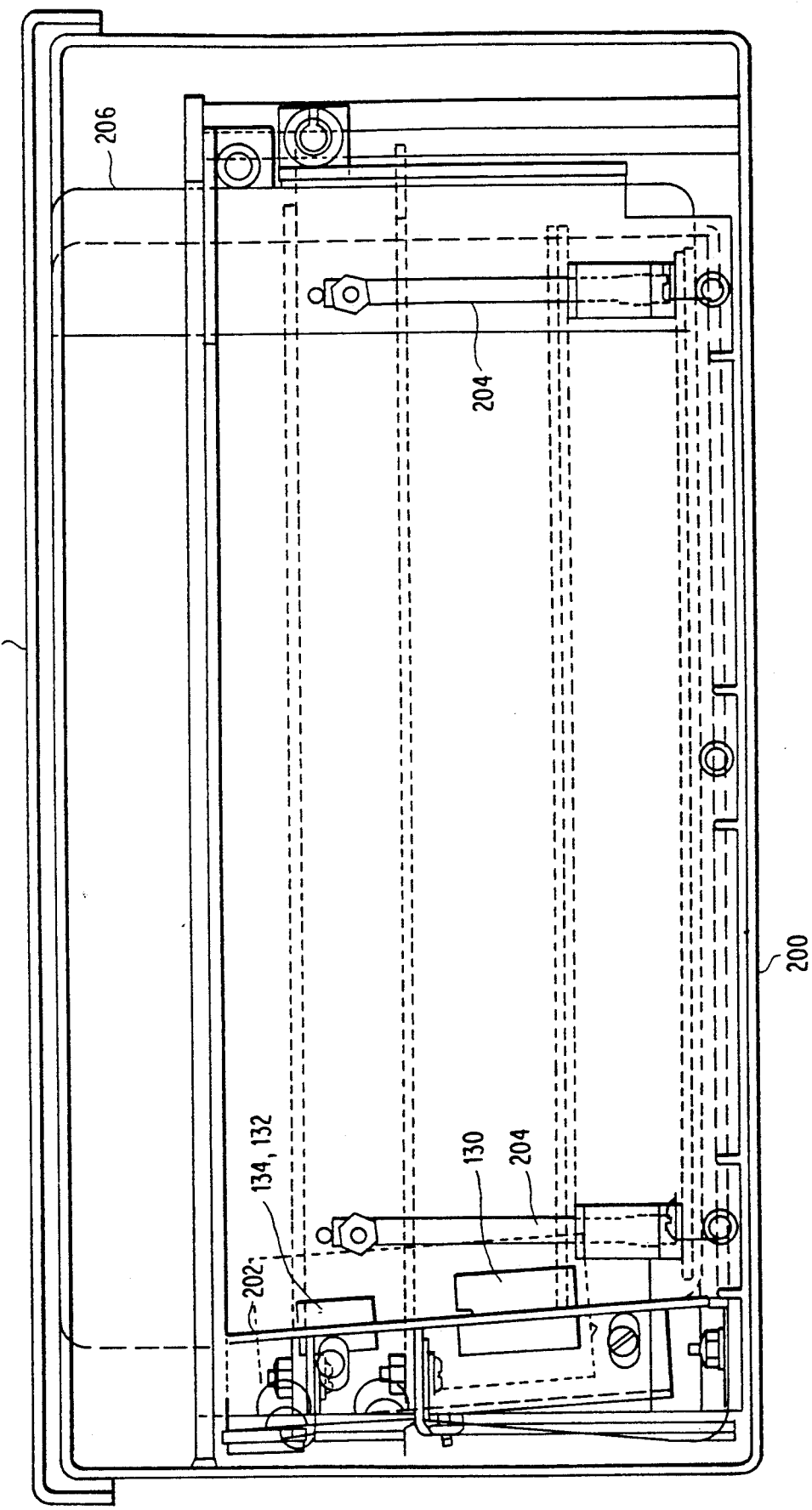
FIG. 7 is a cross-sectional view of the recorder case showing, in side view, the removable memory module inserted in the case.
Figure 8:
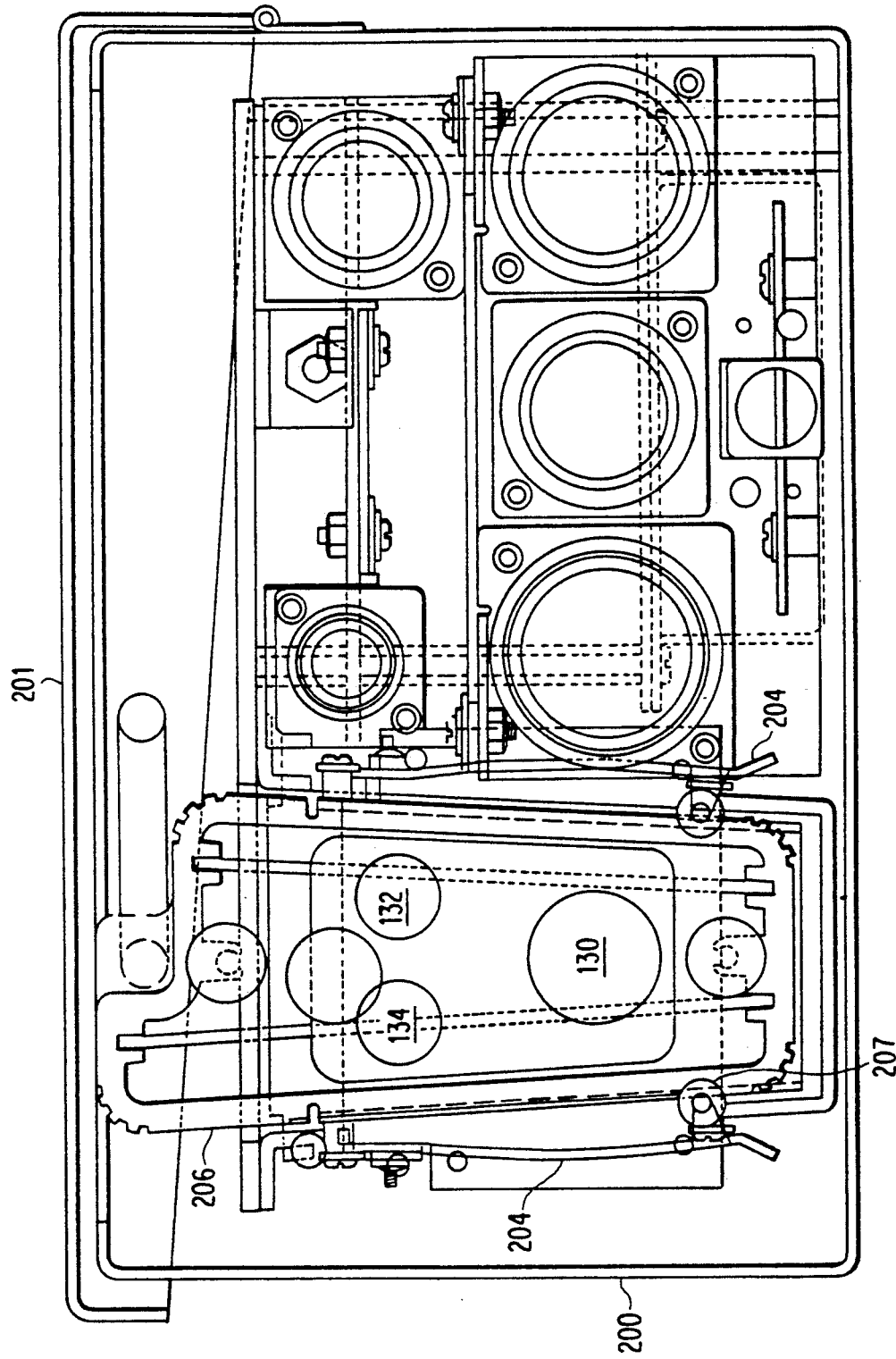
FIG. 8 is a partial cross-sectional view of the recorder case showing, in end view, the removable memory module inserted in the case.

FIGS. 7 and 8 show, respectively, side and end views of the removable memory module 28 in the solid state recorder case 200 having a hinged lid 201. The ferrite core pairs 130, 132 and 134 mate at one end of the opening that receives the memory module, the ferrite cores in the recorder being mounted on a spring biased movable plate 202. Spring biased roller detentes, one pair on either side of the memory module, generally indicated by reference numeral 204, secure the memory module in the opening. The housing 206 for the removable memory module 28 is made of extruded aluminum and includes a groove 207 on either side of the housing for receiving the rollers of the detentes 204. This assures good vertical positioning of the module within the recorder case, but there can be some limited horizontal movement along the axis of the module, particularly with the vibration on board a railroad locomotive. This is compensated for by the movable plate 202 which assures good alignment of the ferrite core pairs on either side of the recorder/memory module interface.

Figure 9:
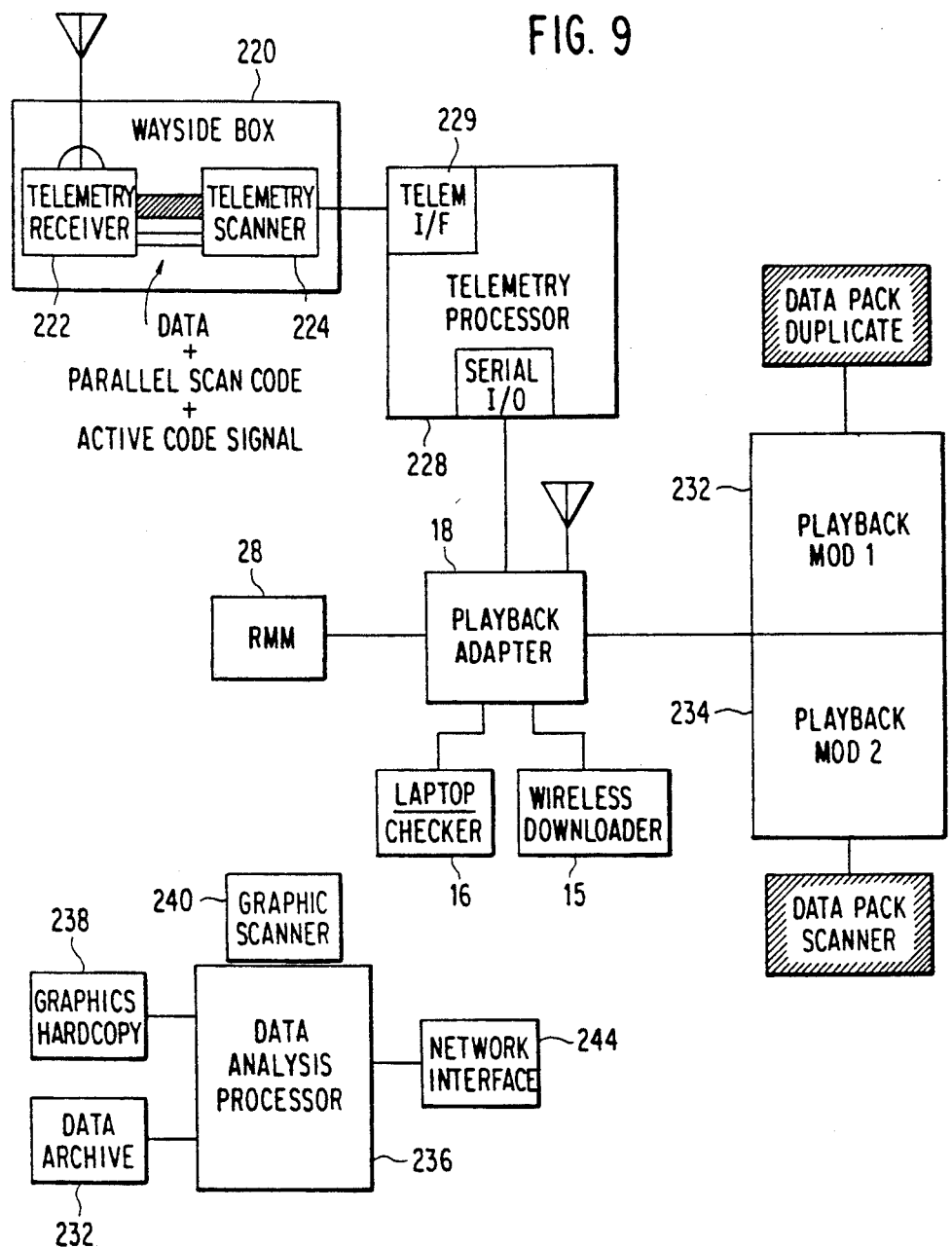
FIG. 9 is a block diagram of the playback system used with the solid state recorder of the invention.

Referring now to FIG. 9, there is shown a block diagram of the solid state recorder playback system. Wayside boxes 220 are provided at intervals along the railroad track. Each of these boxes includes a telemetry receiver 222 and a telemetry scanner 224. The telemetry receiver 222 is used to download data from the telemetry transmitter 26 from the solid state recorder as the train passes the wayside box. Downloaded data from wayside box 220 is supplied the playback adapter (PA) 18 via a telemetry processor 228. The PA 226 can also directly receive inputs from a removable memory module 28 and a laptop computer 16. The interface for the removable memory module 28 is an inductive interface having the same mechanical and electrical characteristics as that between the removable memory module and the solid state recorder.

The telemetry scanner 224 provides scanning and selection of telemetry channels. It interfaces to the telemetry receiver 222 through a parallel interface. The scanner provides a 14-bit scan code corresponding to a transmitter's code. The scanner 224 interfaces with the telemetry processor 228 using the following transaction set:

WHICH TRANSMITTERS ARE LOCAL? — Returns a list of local transmitters.

PASS DATA FROM TRANSMITTER X — Passes data from transmitter X from the receiver through the scanner and to the processor.

TRANSMITTER NO LONGER AVAILABLE — Reports to the processor if the transmitter has moved out of range. This is used to abort a data dump to the processor.

The physical link between the scanner and processor consists of two serial links, one for data transfer and the other for a command channel. The telemetry interface card 229 provides the interface from the telemetry scanner 224 to the telemetry processor 228. The interface card 229 provides a high speed serial link into the processor and also provides DMA (direct memory access) capability to move the received data to the processor's hard disk.

The telemetry processor 228 acts as the central collection node for the telemetry network. It maintains a database of telemetry download activity. The processor 228 is implemented with a personal computer (PC) such as an IBM PC or compatible computer having a hard disk, display and serial port. The telemetry processor 228 drives the PA 18 with data from a selected locomotive using the following transaction set:

START/CONTINUE SENDING DATA — Toggles the flow of data from the laptop computer.

STOP SENDING — Suspends data transfer.

SET DUMP POINTER TO OLDEST DATA — Allows the data dump to go from oldest to newest data.

DUMP DATA FROM NEWEST TO OLDEST — Dump the newest data first. Allows determining last locomotive, etc.

In addition, a wireless downloader 15 can be used to selectively download data from solid state recorders. The wireless downloader 15 can accept several downloads and can drive the PA 18 with selected data from one of the downloads. The PA 18 has a user interface that allows the user to select the locomotive to download, select the transmitter code to listen to based upon available codes, and select data to send to the PA. The transaction set between the PA 18 and the wireless downloader 15 is as follows:

START/CONTINUE SENDING DATA — Toggles the flow of data from the laptop computer.

STOP SENDING — Suspends data transfer.

SET DUMP POINTER TO OLDEST DATA — Allows the data dump to go from oldest to newest data.

DUMP DATA FROM NEWEST TO OLDEST — Dump the newest data first. Allows determining last locomotive, etc.

The PA 18 maintains a real time clock which is periodically updated from time transmissions from station WWV of the National Institute of Standards and Technology (formerly National Bureau of Standards). This clock is used as a reference to associate real time with recorder events. The PA clock (not shown) is a conventional IC clock chip which can drift up to ±1 min. a month. To correct this drift, the clock is updated by a commercially available radio controlled clock which receives transmissions from WWV. Updates are at one hour intervals, so long as a transmission from WWV is received properly. If the time has not been received from WWV for a predetermine period of time, then whenever a user plugs in a removable memory module that needs time correction, the PA 18 will declare on its display that a time emergency has occurred. In this case, the PA time is corrected manually by the operator.

The solid state recorder has no time of day clock. Only the removable memory module 28 has a time of day clock, but since this clock is subject to drift, it is referred to as a relative time clock. Correction for this drift takes place when the data is downloaded. Correction is in the form of a time error and is computed as the absolute difference in time; i.e. a time offset. For example, when the removable memory module 28 is plugged into the PA 18, the error is computed as the difference of the PA real clock time and the relative clock time of the removable memory module.

Normally, it is expected that when the removable memory module is removed from the solid state recorder it will be downloaded by the playback adapter within a relatively short period of time. However, the time period between removal of the memory module 28 from the solid state recorder 10 and insertion into PA 18 can be the source of a time error, particularly if that time period becomes long as measured by the drift rate of the removable memory module clock. This problem can be avoided by scheme illustrated in FIGS. 9A and 9B.

Figure 9A:
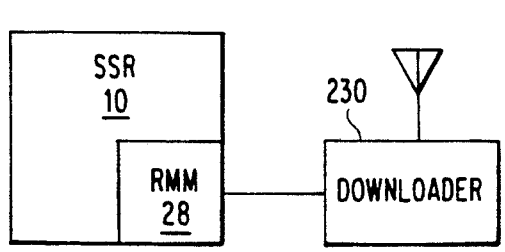
FIGS. 9A and 9B are block diagrams illustrating the operations of a timing scheme used in one possible implementation of the invention.

In FIG. 9A, a downloader 230 is provided with an accurate, radio controlled clock identical with that in the playback adapter. This downloader may be a wireless downloader, like the downloader 15, or it may be cable connected to the solid state recorder 10, like the laptop computer 16. The downloader 230 downloads the data from the removable memory module 28 without removing it from the solid state recorder 10. When that data is downloaded, the downloader 230 makes the time difference computation and stores it with the downloaded data. This may be done for several such solid state recorders, the data for each recorder being identified by the locomotive number or some such other identifier.

Figure 9B:
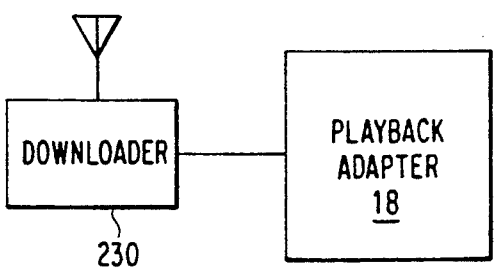

In FIG. 9B, the downloader 230 is connected to the PA 18 to readout the data that it has collected from several solid state recorders. Since the downloader 230 has its own radio controlled clock, the PA 18 accepts the time from the downloader without any further correction.

The PA 18 provides the capability to play back data obtained from the solid state recorder, no matter from what source, on an existing Pulse playback system. The PA 18 encodes the solid state recorder encoded data and drives the playback and is capable of driving both an existing playback 232 and a modified version of the playback 234, and is therefore fully compatible with the user installed base of Pulse playback units.

The only difference between the interfaces between the input devices and the PA 18 is the physical protocol level. The PA 18 communicates with all the data input devices using the following transaction set:

START/CONTINUE SENDING DATA — Toggles the flow of data form the laptop computer.

STOP SENDING — Suspends data transfer.

SET DUMP POINTER TO OLDEST DATA — Allows the data dump to go from oldest to newest data.

DUMP DATA FROM NEWEST TO OLDEST —
Dump the newest data first. Allows determining the last locomotive, etc.

The PA 18 interfaces to the Pulse playback units 232 or 234 at the tape head input. The PA 18 also has a connection to a data analysis processor 236 and can be run in remote mode from this processor. The data analysis processor permits sophisticated analysis of the data from the various collection devices. A report printer 238 provides a graphic output of selected data. A graphic display 240 permits displaying "charted" data on the display screen. A data archival unit 242 provides storage space for acquired data. A network interface 244 provides an interface into the railroad's computer network to allow transferring data.

Figure 10:
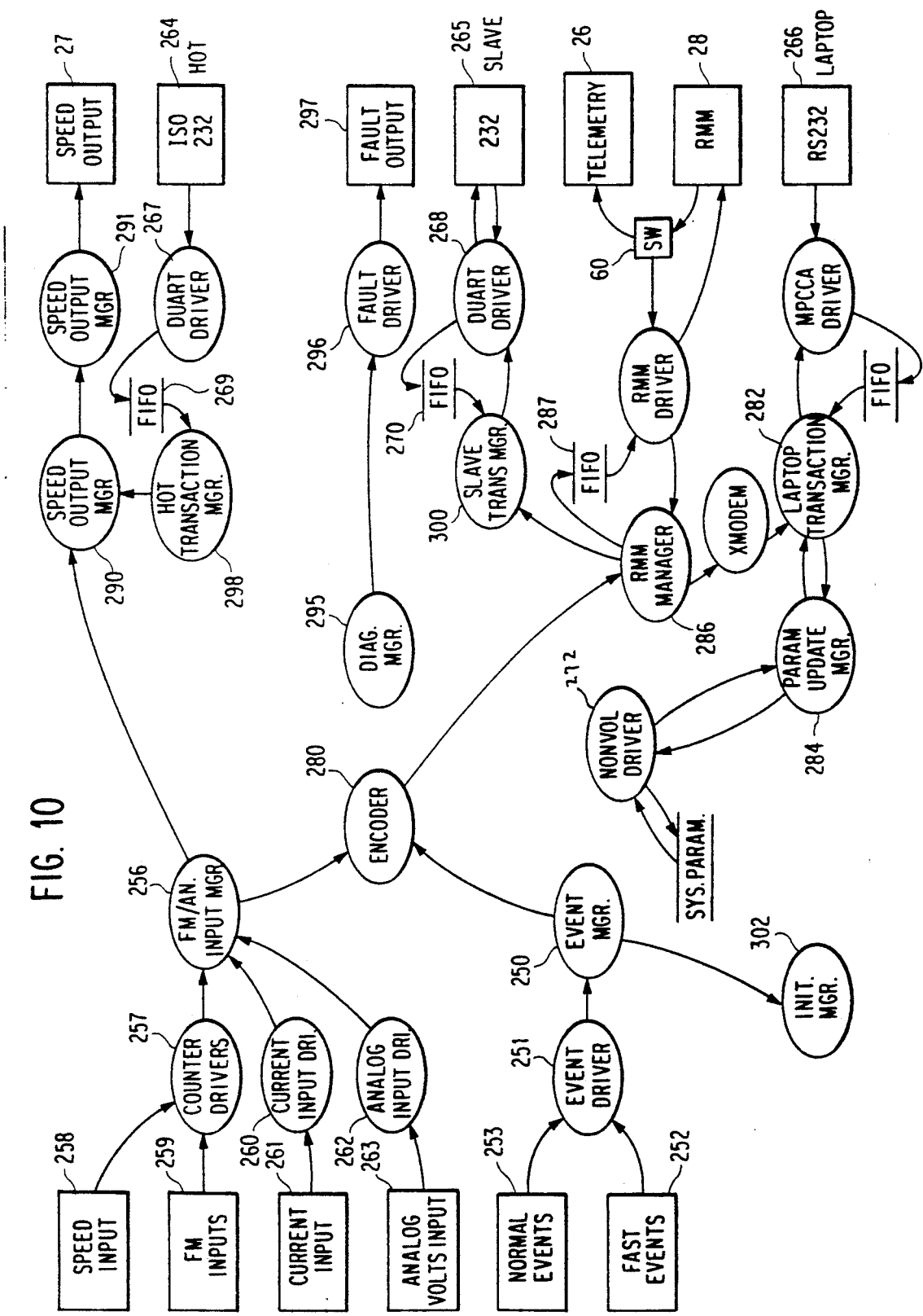
FIG. 10 is a data flow diagram illustrating the program modules for the solid state recorder.

FIG. 10 is a data flow diagram of the software implemented in firmware in the solid state recorder. The following description defines the functions contained within each of the data flow bubbles of FIG. 10, these functions being described using the ANSI C function prototype format. The functions may be readily implemented in the C programming language or assembly language, depending upon specific timing and memory requirements of each function.

The event manager 250 provides interface functions to the event inputs of the system. All inputs to the system including FM inputs are brought in on an event line. The event_driver function 251 maintains the state of the event inputs for the event manager 250. There are two types of events, fast events 252 and normal events 253. All events are sampled every 50 ms. Fast events 252 change state when five samples in a row show the event in a changed state. Fast events 252 are latched until read. Normal events 253 change state when ten samples in a row show an event in a changed state. Normal events are not latched. Another function provided by the event manager is the event change function. Events may be selected to be included in determining if an event change has occurred. This permits rapid determination of a change in any event.

The configuration of inputs are included among the event inputs and a function is provided which determines the current recorder configuration.

```
int init_events( void );
    return
        OK,FAILED
```

This function initializes the event manager and event driver.

```
unsigned char get_fast_event( unsigned
    char ev_num );
    ev_num
        EV1 ... EV23
    return
        HIGH (>0) , LOW (0)
```

This function returns the state of the fast event inputs. Fast events are sampled every 50 ms. If an event exhibits a state change for five sequential samples, the change of state is latched and is returned at the next call to this function. This call to the function also resets the latch.

```
Unsigned char get_normal_event( unsigned char
```

```
    ev_num );
    ev_num
        EV1 ... EV23
    return
        HIGH (>0) , LOW (0)
```

This function returns the state of the normal event inputs. Normal events are sampled every 50 ms. If an event exhibits a state change for ten sequential samples, the change of state is recorded and is returned at the next call to this function. Normal events are not latched and may therefore change state two or more times between function calls.

```
int event_change( void );
    return
        YES,NO
```

This function determines if any events enabled by enable_event() have changed state since the last call to this function.

```
int enable_fast_event( unsigned char
    ev_num );
    event_num
        EV1 EV2 EV3 EV5 EV8 EV12 etc.
    return
        OK,FAILED
```

This function enables events for detection by the event_change () function. This function resets the event_change() state to NO changes.

```
int enable_normal_event( unsigned char
    ev_num );
    event_num
        EV1 EV2 EV3 EV5 EV8 EV12 etc.
    return
        OK,FAILED
```

This function enables events for detection by the event_change() function. This function resets the event_change() state to NO changes.

```
int disable_event( unsigned char
    ev_num );
    list
        EV1 EV2 EV3 EV5 EV8 EV12 etc.
    return
        OK,FAILED
```

This function disables events for detection by the event_change() function. This function resets the event_change() state to NO changes.

```
void output_signal( int out_num , int
    state );
    ev_num
        GP_OUT
    state
        ACTIVE,INACTIVE
```

This function sets the state of an output signal.
    void event_driver( void );
This function is run every 50 ms. It updates the state of the events for the event manager.

```
int event_recorder_type( void );
    return
        PIN_FOR_PIN
        SLAVE
        MASTER
```

This function returns the recorder configuration.

There are a number of frequency modulated and analog inputs to the system. The Analog/FM input handler 256 provides a set of functions for managing these inputs. The inputs are initialized according to the recorder type selected. The initialization performs the counter setup via the counter drivers 257 as well as routing the appropriate solid state recorder inputs to the counters. One channel, the speed input 258, is provided for pulse width measurement and conversion to the appropriate frequency. The returned frequency is thirty-two times the measured frequency. A general purpose function is provided for the remainder of the FM inputs 259. A current driver 260 provides a current input 261 to the FM/analog handler 256, while another function 262 is provided for the analog voltage input 263.

A pair of functions is provided for totalizing cycles on any of the inputs. When totalize_cycles is called, the totalizing for that channel begins. Calls to get_totalized_cycle reads the total number of cycles accumulated thus far.

```
int init_fm_analog_inputs( int
    recorder_type );
    recorder_type
        PIN_FOR_PIN
        SLAVE
        MASTER
    return
        OK,FAILED
```

This function initializes the frequency inputs and outputs based upon the recorder type.

```
int get_pwm_cycles( void );
    return
        0-352 Hz
```

This function returns the average number of cycles of the PWM input since the last call. Once called, it begins averaging again.

void current_int_input( void );

This function should be run at each cycle of the PWM input signal. To implement this, the PWM signal is brought into a falling edge triggered interrupt and the function is run at each interrupt.

```
int get_cycles( int ev_num );
    ev_num
        CEV11,CEV12,CEV19,CEV20,CEV21,
            CEV23
    return
        0-366 Hz
```

This function returns the number of cycles since the last call to the function.

```
int get_atd_value( int av_num );
    av_num
```

```
        AV1
    return
        0-255 full range
```

This function returns the voltage at the specified input normalized 0-255.

```
int totalize_cycles( int ev_num );
    ev_num
        CEV11,CEV12,CEV19,CEV20,CEV21,
            CEV23
    return
        OK,FAILED
```

This function starts totalizing on the specified frequency input.

```
long get_totalized_cycles( int ev_num );
    ev_num
        CEV11,CEV12,CEV19,CEV20,CEV21,
            CEV23
    return
        0-2   32 cycles
```

This function returns the total number of cycles accumulated since the call to totalize_cycles() for the specified input.

The counter driver 257 performs the following functions.

```
void init_counter( unsigned int address,
        unsigned char mode );
    address
        address of counter
    mode
        MODE0 ... MODE5
```

This function initializes the counter specified on the specified device to the selected mode.

```
void latch_counters( unsigned in
        control_address, unsigned char
        counter_mask );
    control_address
        address of control register
    counter_mask
        COUNTER0_MASK ... COUNTER2_MASK
```

This function latches the specified counters. More than one counter may be latched by ORing more than one counter mask.

```
in get_counts( unsigned in address );
    address
        address of counter
    return
        counter value 0-65535
```

This function gets the current count value for the specified counter.

```
void put_counts( unsigned int address ,
        unsigned in value );
    address
        address of counter
    value
```

0-65535

This function writes a new count value to the specified counter.

```
unsigned char get_counter_status(
    unsigned int address );
    address
        address of counter
    return
        status byte
            OUT_PIN
            NULL_COUNT
            etc.
```

This function returns the status of the specified counter.

There are three serial ports 264, 265 and 266 in the system. They are all general purpose EIA232 ports. Two UARTS 267 and 268 are used for two of the three channels. As such, there are two UART initialization routines. All serial channels are interrupt driven and all are implemented with multilevel receiver FIFO (first-in, first-out) registers 269 and 270. The basic functions provide for getting a character from a port and putting a character to a port. The get function returns immediately with or without a character.

A setup function is provided for the asynchronous channels. This permits setting baud rates and parameters for each channel.

```
int_init_duart1( void );
return
    OK,FAILED
```

This function initializes the first DUART.

```
int_init_duart2( void );
return
    OK,FAILED
```

This function initializes the second DUART.
void init_fifos( void );
This function initializes the FIFO registers.

```
int getc( int port_num );
port_num
    INTERNAL
    DUART1_A
    DUART1_B
    DUART2_A
return
    character (0 - 255)
    NO_CHAR_AVAIL
```

This function returns the last character received from the specified serial port. All serial port receivers are implemented using interrupts and FIFO registers. This function returns a character from the FIFO register. If there are no characters in the FIFO, it returns NO_CHAR_AVAIL.

```
int putc( int port_num, int c );
port_num
    INTERNAL
    DUART1_A
    DUART1_B
    DUART2_A
    c
    character to send (0 - 255)
return
    OK,FAILED
```

This function sends a character through the specified port.

```
int getch( int port_num, int time );
port_num
    INTERNAL
    DUART1_A
    DUART1_B
    DUART2_A
    time
        time in 50 ms increments
return
    character,FAILED
```

This function gets a character from the specified port. If no character is available after time, the function returns FAILED.

```
void putchar( int c ); /*used by printf*/
/*fixed call to putc*/
    c
    character to send (0 - 255)
```

This function is used by printf and sends the character to the laptop port. The port can be chosen at compile time in the serio.s03 file.

```
int setup( int port_num , int baud , int parbits );
port_num
    INTERNAL
    DUART1_A
    DUART1_B
    DUART2_1
baud
    B300,B600,B1200,B2400,B4800,
    B9600,B19200
parbits
    PBN8 (No parity, 8 bits)
    PBE8 (Even parity, 8 bits)
    PBO8 (Odd parity, 8 bits)
    HDLC (HDLC mode)
return
    OK,FAILED
```

This function permits setting the communication parameters for the specified port. The function will return with an error if an invalid request is made.
 void comm_comm_int_handler( void );
This function is called when a communications interrupt IRQ1 is active. It prioritizes the interrupt and updates the FIFO register(s) of the ports.
 void int_comm_int_handler( void );
This function is called when the internal UART generates an interrupt. It updates the FIFO register.

Nonvolatile data storage is provided by a serial EEPROM (electronically erasable/programmable read only memory). A number of low level functions are provided for the nonvolatile driver 272.
 void init_nonvol( void );
This function initializes the nonvolatile driver.

```
int nonvol_write( int address, int data);
address
    0x00 - 0x3F
data
    0x0000 - 0xFFFF
returns
    OK,FAILED
int novol_read( int address );
address
    0x00 - 0x3F
returns
    0x0000 - 0xFFFF
```

The encoder 280 performs the following functions.

```
void init_encoder( void );
void encode( int recorder_type );
recorder_type
    PIN_FOR_PIN
    SLAVE
    MASTER
void init_record( void );
void add_to_record( int num_bits, int data );
num_bits
    number of bits for this data
data
    data word
void crc_record( void );
int record_size( void );
return
    size of record in bytes
void write_record( int num_bytes );
num_bytes
    size of record in bytes
```

The laptop manager 282 performs the following function.

```
void init-laptop_trans mgr( void );
void laptop_manager( int port_num );
port_num
    1,2,3,4
```

The laptop manager 282 is a function that is run periodically to check for requests from the laptop port 266. It uses the get_laptop_int_fifo() function to read characters that have come from the laptop.

```
void xmodem_dump( int port_num );
port_num
    1,2,3,4
```

The parameter update manager 284 performs the following function.

```
void param_update_mgr( int port_num );
port_num
    1,2,3,4
```

This function is called by the laptop manager 282 and permits updating the nonvolatile parameter storage area through an interactive session over the laptop serial port 266.

The removable memory module (RMM) manager 286 provides functions for communicating and passing data to and from the removable memory module 28. The basic functions are to read and write data. In addition, there are functions to obtain real time clock data from the removable memory module.

In all functions, *buffer points to a structure FRAME_TYPE with the following form:

```
struct frame
{
unsigned char command;
unsigned char count;
unsigned char buf[255];
}
int rmm_write( RMM_FRAME_TYPE *buffer );
*buffer
    pointer to buffer to write
return
    error status
int rmm_dump_data( void );
return
    RMM error code
```

This function initializes the removable memory module FIFO register 287 and then gets download data from the removable memory module 28.

```
int rmm_read( void );
return
    value,FAILED
```

This function reads the next byte of data from the removable memory dump.

```
int rmm_eomem( void );
return
    NO,YES
```

This function determines if the end of the data has been reached.

```
int rmm_status( unsigned char *buffer );
*buffer
    pointer to FRAME_TYPE
return
    count
int rmm_reset_status( void );
return
    RMM error code
```

This function resets the resetable bits/bytes in the RMM status information.

```
int rmm_time_yymmddhhmmssss( unsigned char *buffer );
return
    OK,FAILED
*buffer
    year                         LSbyte
    month
    date
    day_of_week
    hour
    minute
    second
    hundredth second             MSbyte
int rmm_update_time_yymmddhhmmssss( unsigned char *buffer );
return
    OK,FAILED
*buffer
    year                         LSbyte
    month
    date
    day_of_week
```

```
            hour
            minute
            second
            hundredth second                        MSbyte
            void rmm_driver( void );
```

The speed output manager 290 receives data from the FM/analog input manager 256 and drives the speed output 27 via the speed output driver 291. The speed output manager performs the following function.

```
            void init_speed_output_mgr( void );
            void speed_out( int speed_cycles );
            speed_cycles
            0 - 352 cycles per second
```

The fault/diagnostics manager 295 provides functions for checking the integrity of system operation. The functions that return OK will not return if a system fault is found; instead, the fault_handler 296 is called and an appropriate action is taken, such as activating an audible or visual alarm 297.

The fault_lamp_cycle function is called by the fault handler during a hardware time window.

```
            int check_stacks( int function_code );
            function_code
            entry address of function
            return
            OK,fault code
            int check_pc( int function_code );
            function_code
            entry address of function
            return
            OK,fault_code
            void safe_dptr( void );
            int check_flags( void );
            return
            OK,fault_code
            void _fault_handler( int fault_code );
            void diagnostic_mgr( void );
            void _watchdog_cycle( void );
            void _fault_lamp_cycle( void );
```

The HOT receiver transaction manager 298 communicates with the speed output manager 290 and performs the following functions.

```
            void init_hot_trans_mgr( void );
            void hot_trans_mgr( void );
```

The slave recorder transaction manager 300 communicates with the removable memory module manager 286 and via UART driver 268 and serial port to a slave solid state recorder. The slave recorder transaction manager 300 performs the following functions.

```
            void init_slave_trans_mgr( void );
            void slave_trans_mgr( void );
```

The initialization manager 302 communicates via the event manager 250 to encoder 280 and performs the following function.

void init_mgr( void );

The init mgr function 302 calls the other initialization managers within the system to ready the system for operation.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a vehicle mounted system for monitoring events, said system including a plurality of event inputs for receiving analog and digital data to be recorded, interface means connected to said event inputs for buffering digital inputs and converting analog inputs to digital values, first microprocessor means connected to said interface means for formatting data provided by said interface means, a solid state memory means coupled to said first microprocessor means for receiving and recording formatted data, said solid state memory means being electrically isolated from said vehicle mounted system, the improvement comprising:

an array of solid state memory devices and a second microprocessor means in said solid state memory means, said second microprocessor means receiving data from said first microprocessor means and recording said data in said array of solid state memory devices, said data being directly transmitted between said first and second microprocessor means as digital signals; and inductive interface means between said solid state memory means and said first microprocessor means for transferring data between said first microprocessor means and said second microprocessor means and for coupling power from said vehicle mounted system to said solid state memory means.

2. The improvement in the solid state event recorder recited in claim 1 wherein said inductive interface means comprises first, second and third ferrite core pairs, each core pair having a primary winding and a secondary winding wound on a respective one of said cores, said cores of each pair being positioned for alignment with one another.

3. The improvement in the solid state event recorder recited in claim 2 further comprising:

oscillator means connected to the primary winding of said first core pair for inductively coupling alternating current power to the secondary winding of said first core pair;

rectifier means connected to the secondary winding of said second core pair for producing a rectified direct current voltage;

first phase splitter and driver means connected to the primary winding of said second core pair for coupling data signals from said first microprocessor means to the secondary winding of said second core pair; and second phase splitter and driver means connected to the primary winding of said third core pair for coupling data signals from said memory means to the secondary winding of said third core pair.

* * * * *